Figure 5:
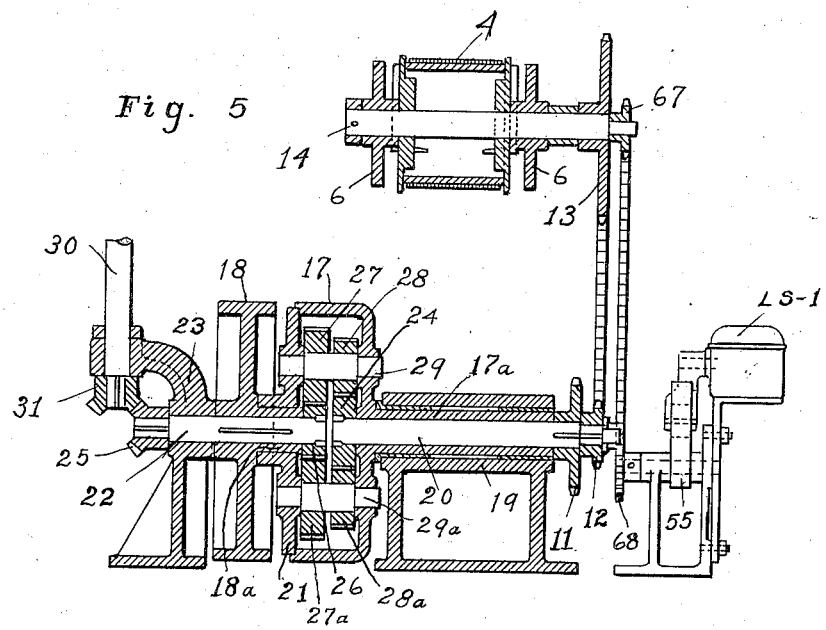

Nov. 8, 1938.　　　W. A. MORTON ET AL　　　2,135,986
ARTICLE TRANSFER AND LOADING DEVICE
Filed Jan. 3, 1936　　　5 Sheets—Sheet 1

INVENTOR
William A. Morton
Harold A. Moore
BY Herman A. Roth
William B. Jaspert
ATTORNEY Nov. 8, 1938.   W. A. MORTON ET AL   2,135,986
ARTICLE TRANSFER AND LOADING DEVICE
Filed Jan. 3, 1936   5 Sheets-Sheet 2
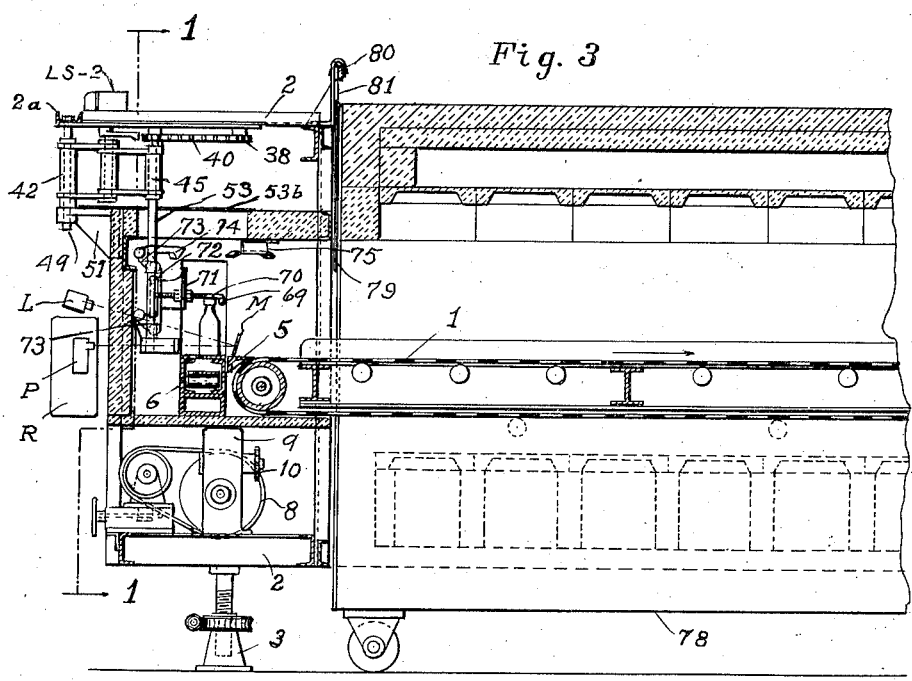
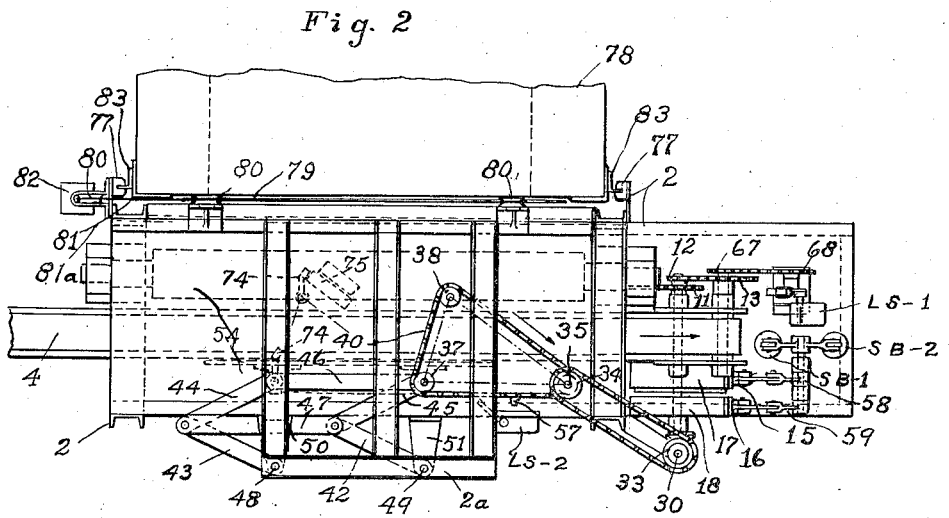
INVENTOR
William A. Morton
Harold A. Moore
Herman A. Roth
BY William B. Jaspert
ATTORNEY Nov. 8, 1938. W. A. MORTON ET AL 2,135,986
ARTICLE TRANSFER AND LOADING DEVICE
Filed Jan. 3, 1936 5 Sheets-Sheet 3

INVENTOR
William A. Morton
Harold A. Moore
Herman A. Roth
BY William B. Jaspert
ATTORNEY Nov. 8, 1938.  W. A. MORTON ET AL  2,135,986
ARTICLE TRANSFER AND LOADING DEVICE
Filed Jan. 3, 1936   5 Sheets-Sheet 4

INVENTOR
William A. Morton
Harold A. Moore
BY Herman A. Roth
William B. Jaspert
ATTORNEY

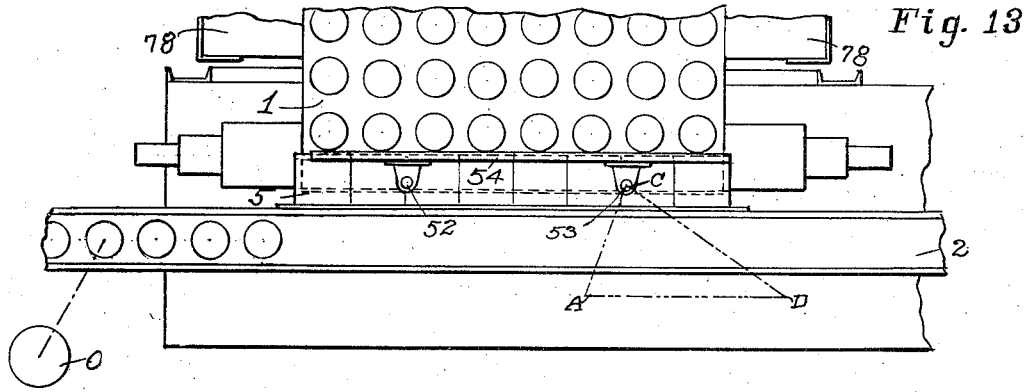
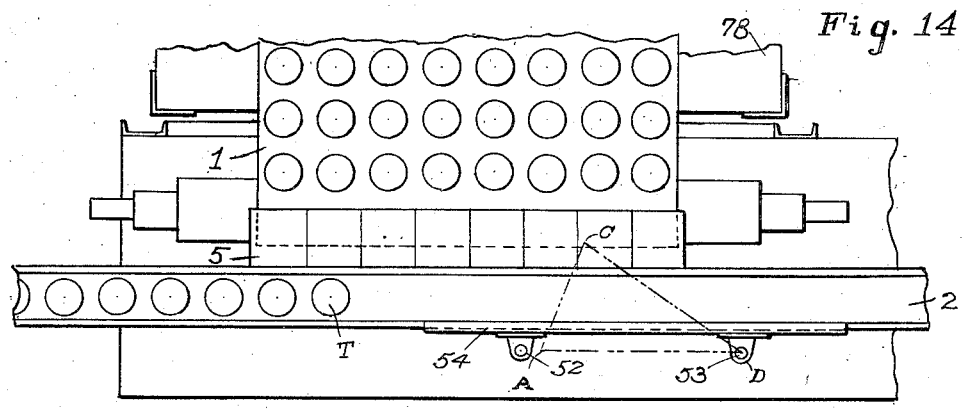
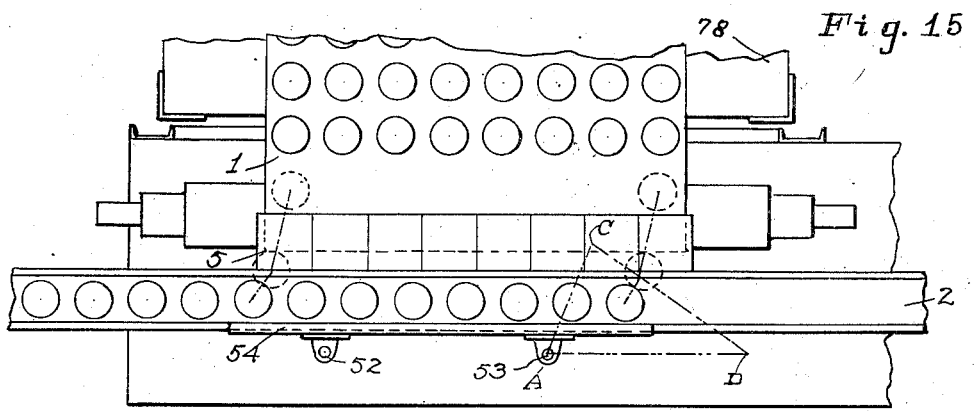

Patented Nov. 8, 1938

2,135,986

UNITED STATES PATENT OFFICE 2,135,986

ARTICLE TRANSFER AND LOADING DEVICE

William A. Morton, Mount Lebanon, and Harold A. Moore and Herman A. Roth, Wilkinsburg, Pa., assignors to Amco, Incorporated, Pittsburgh, Pa., a corporation of Pennsylvania Application January 3, 1936, Serial No. 57,370

6 Claims. (Cl. 198—31)

This invention relates to improved transfer and loading mechanism for articles which herein are exemplified as glassware, the mechanism being illustrated as used for transferring rows of bottles from a loading conveyor to a main conveyor of a glass annealing lehr.

It is among the objects of the invention to provide article transfer and loading mechanism for transferring the articles in rows from a continuously moving loading conveyor to a continuously moving lehr conveyor moving at right angles to the direction of movement of the said first-named conveyor.

A further object of the invention is the provision of pusher mechanism for transferring rows of ware from one moving conveyor element to another, which shall be operative and the movements of which shall be coordinated with the movement of the loading conveyor and ware to permit continuous movement and accumulation of the ware to and in front of the pusher device.

A further object of the invention is the provision of transfer mechanism with a pusher arm which shall move the ware from a loading conveyor in a path substantially transverse to the direction of movement of said conveyor, and which shall upon its retraction stroke simultaneously advance in the direction of movement of the ware on the loading conveyor to thereby avoid interference with the articles accumulating on said conveyor.

Still a further object of the invention is the provision of means whereby movement of the pusher mechanism is coordinated with the movement of the loading conveyor and with the movement of the articles on the loading conveyor.

Figure 1:
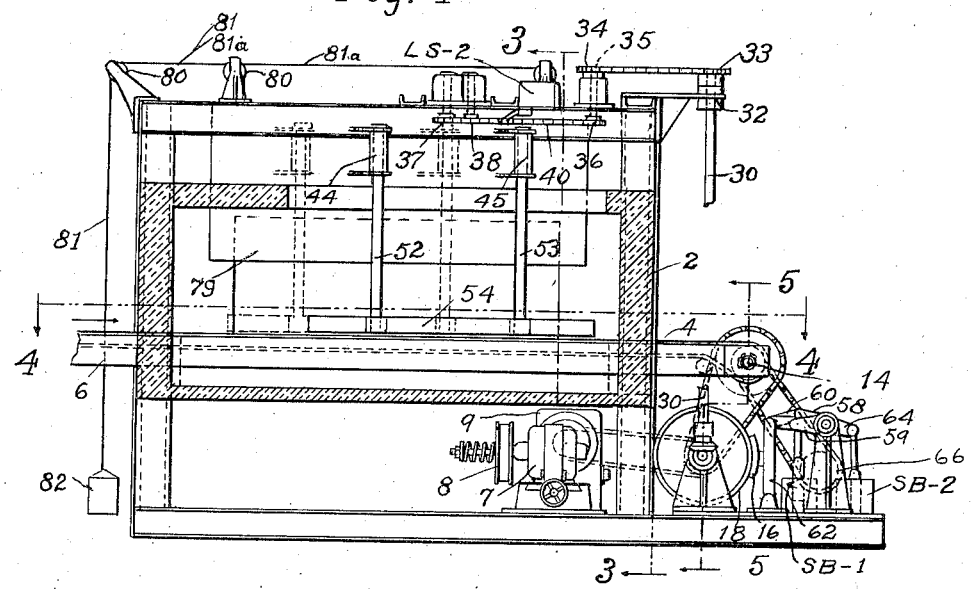
Figure 4:
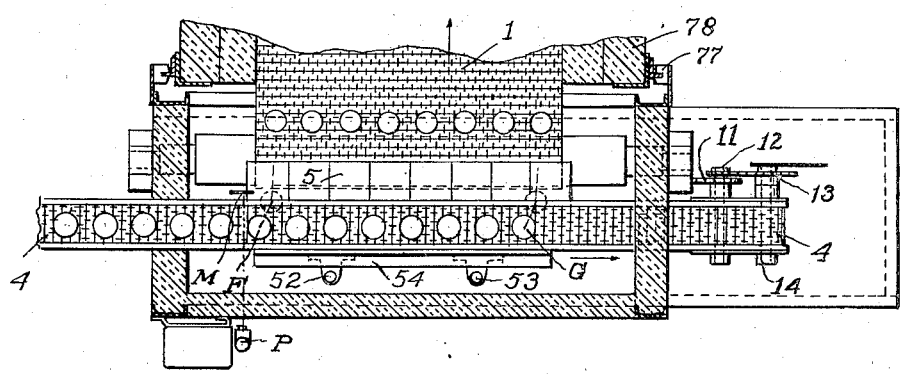
Figure 6:
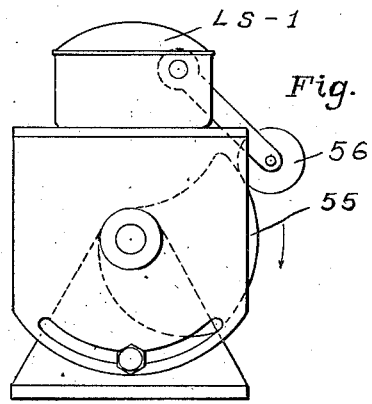
Figure 7:
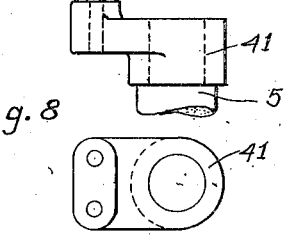
Figure 8:
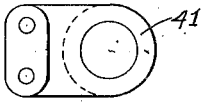
Figure 9:
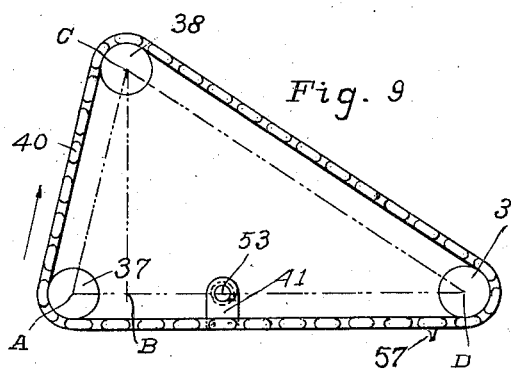
Figure 10:
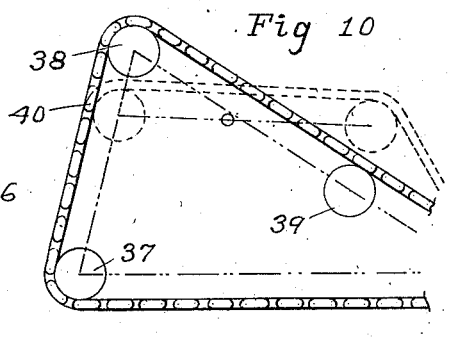
Figure 12:
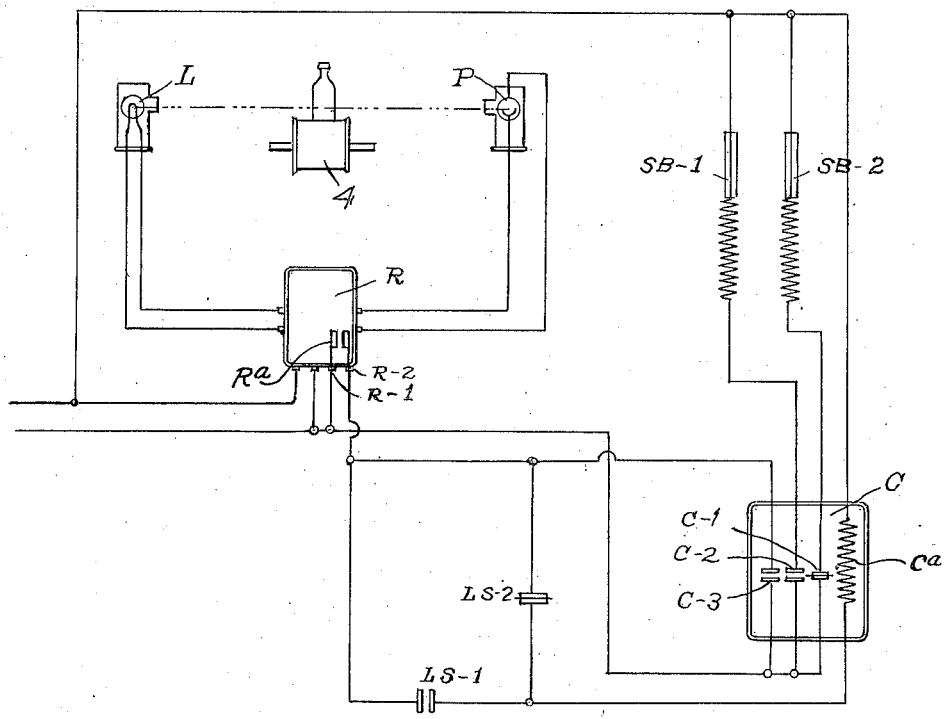
Figure 11:
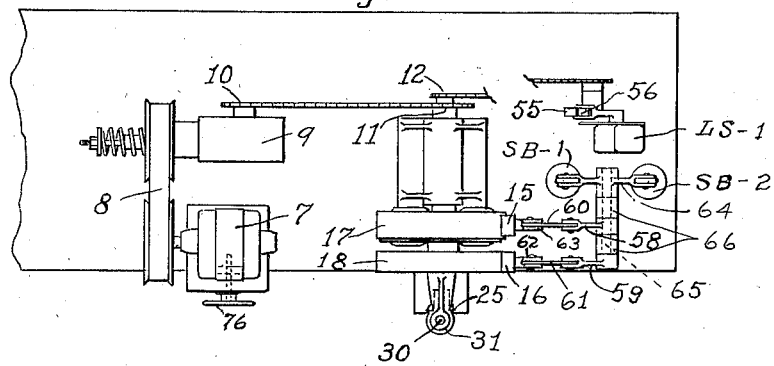

These and other objects of the invention will become more apparent from a consideration of the accompanying drawings constituting a part hereof in which like reference characters designate like parts and in which:

Fig. 1 is a vertical section taken along the line 1—1 of Fig. 3;

Fig. 2 a plan view of an article loading and transfer mechanism embodying the principles of this invention;

Fig. 3 a vertical section thereof taken along the line 3—3, Fig. 1;

Fig. 4 a horizontal section taken on the line 4—4, Fig. 1;

Fig. 5 a vertical section through a portion of the drive mechanism taken along line 5—5, Fig. 1;

Fig. 6 an elevation of a limit switch and actuating mechanism therefor;

Fig. 7 an elevational view of a portion of the transfer mechanism illustrating the attachment of the drive chain which is shown in cross-section;

Fig. 8 a plan view of the attachment element of Fig. 7;

Fig. 9 a plan view of the transfer chain and its supports;

Fig. 10 a plan view of the transfer chain diagrammatically illustrating means for its adjustment;

Fig. 11 a plan view of the drive and timing mechanism with the loader conveyor and upper structure removed;

Fig. 12 a wiring diagram illustrating the electrical apparatus and circuits employed for controlling the operating mechanism; and Figs. 13 to 15 inclusive diagrammatically illustrate the movement of the pusher mechanism in transferring the articles from the loader conveyor to a main conveyor element.

As shown in Figs. 2 and 3, the loader parts and the bearings of the main or lehr conveyor 1 also herein referred to as the receiving conveyor are mounted in the vertically movable structural framework 2 which is attached to the glass annealing lehr or tunnel and is vertically slidable thereon. A short section of the frame of conveyor 1 is pivoted at a convenient point a substantial distance rearward in the lehr tunnel, not shown so that it may swing vertically with the loader structure as the latter is raised or lowered by means of the worm-driven screw-jacks 3 to accommodate articles of different height.

The loading conveyor 4, Fig. 2, is positioned adjacent the receiving end of the main conveyor 1 at right angles thereto, the ware-bearing strands of both conveyors being aproximately in the same horizontal plane. In the intervening space between the two conveyors and in close working relation to both is the gap plate 5 over which the transferred ware slides to the main conveyor. The plate 5 is preferably made in several sections, as shown in Fig. 4, each section having a hinged connection to the loading conveyor frame 6 and having thin edges resting upon the main conveyor 1.

The lehr conveyor 1 is driven at the discharge end of the lehr, with means for varying its speed and the separate loading conveyor drive is as shown in Figs. 2, 3 and 11. The feed conveyor drive comprises the motor 7, the variable speed device 8, the worm speed reduction gear 9, the chain connected sprockets 10 and 11, and the chain connected sprockets 12 and 13, the sprocket 13 being keyed to the loading conveyor shaft 14, Fig. 1.

For the purpose of starting and stopping the ware-transferring mechanism, at stated intervals of time hereinafter mentioned, the gear transmission, Fig. 5, is interposed in this drive. It consists essentially of a differential gear transmission, either end of which is held non-rotative by the brake shoes 15 and 16 Fig. 2 on the drums 17 and 18 respectively, one shoe being in all cases released while the other is set.

The drum 17 has an elongated sleeve 17a, integrally cast therewith, which is journaled in the pillar block bearing 19. Within this sleeve is journaled the drive shaft 20.

The drum 18 has an elongated hub 18a upon which is journaled the disc 21, this disc being attached to the drum casting 17. The drum 18 is keyed to the driven shaft 22 which is journaled in the bearing 23. The drive shaft 20 is keyed at its outer end to the sprockets 11 and 12 and at its inner end to the sun-gear 24. The driven shaft 22 is keyed at its outer end to the miter gear 25 and at its inner end to the sun-gear 26. The planetary gears 27 and 28, meshing with the gears 26 and 24 respectively, are keyed on the shaft 29 which has its bearings in the drum web 17 and disc 21.

The gears 27a, 28a are not essential in the operation of the device but serve to balance the radial stresses upon the pairs in mesh and to provide additional strength and wearing qualities. They are keyed to the shaft 29a which also has its bearings in the drum web and disc.

When drum 17 is prevented from turning by brake shoe 15, shaft 22 is driven by shaft 20 through the simple gear train consisting of sun gear 24, planetary gears 28 and 27, and sun gear 26. When drum 18 is prevented from turning by brake shoe 16, drum 17 is driven idly by the action of planetary gear 27 on the stationary sun gear 26, and the gear train becomes an epicyclic train instead of a simple one.

Brake shoe 15 is fastened to lever 63 and is operated through link 60 and toggle arm 58 Fig. 11. Brake shoe 16 is fastened to lever 62 and is operated through link 61 and toggle arm 59. Toggle arms 58 and 59 are keyed to rocker arm shaft 65 which is journaled in bearing 66. Rocker arm 64 is also keyed to shaft 65 and is connected at one end to the plunger of solenoid SB—1 and at its other end to the plunger of solenoid SB—2. The angular relationship between the toggle arms 58, 59 and rocker arm 64 are such that the pulling down of the plunger on solenoid SB—1 will set brake shoe 15 on drum 17, simultaneously releasing brake shoe 16 from drum 18. Similarly, the pulling down of the plunger on solenoid SB—2 will set brake shoe 16 on drum 18, simultaneously releasing brake shoe 15 on drum 17.

The vertical shaft 30 has a bearing in an upward extension of the bearing 23 and is driven by the miter gear 31 meshing with miter gear 25. Rotating in the upper bearing 32, this shaft terminates in the keyed sprocket 33 which is chain connected to the driven sprocket 34, the latter sprocket being keyed to the shaft 35.

Sprocket 36 is keyed to the bottom of shaft 35 and drives transfer chain 40, which also runs upon the direction changing idler sprockets 37 and 38.

Fixed to the chain 40 of the transfer mechanism is the attachment 41, Fig. 9. This attachment is in permanent rotative engagement with the top of the pendant shaft 53, Figs. 1 and 7, hereinafter described. The ware transferring mechanism, above mentioned, comprises the vertically pivoted swinging inner arms 42 and 43, the outer arms 44 and 45, with the connecting links 46 and 47 arranged in pantographic form, as shown in Fig. 2, and fulcrumed upon vertical pins 48 and 49 extending between the brackets 50 and 51 and the top channel 2a.

The pendant shafts 52 and 53 Fig. 1 are journaled in the outer ends of the arms 44 and 45 Fig. 2 and extending downward they are fixed to the push-bar 54 Fig. 1. As the horizontal distance between the centerlines of the chain 40 and the shaft 53, Fig. 7, is equal to the pitch radius of the sprockets 36, 37 and 38, it is evident that the center of shaft 53 will at all times lie in one of the sides of the triangle formed by the straight lines between the three sprocket centerlines in the triangle ACD in Fig. 9.

As the pantographic arms 42, 43, 44 and 45 are of sufficient length to permit the centerline of the shaft 53 to take any position on the triangle ACD it will be seen that any point on the link 46 or upon the push-bar 54 will describe the same triangular path as that of the centerline of the shaft 53 with certain dwell intervals at each sprocket. Also link 46 and pusher bar 54 will always remain parallel to the loading conveyor 4.

The actuation of the push-bar is intermittent and its cyclic period of operation is governed by the time required for any point on the feed conveyor 4 to traverse the width of the lehr tunnel less a small distance to provide for clearance between the ends of the rows of ware and the edges of the main conveyor 1.

The linear speed of the pusher bar has a fixed relationship to the speed of the loading conveyor, and is such that the pusher bar will pass in front of the advancing articles on the loading conveyor while moving back across the latter, on the path from C to D on Fig. 15. The ratio of the distance from B to A to the distance from A to C, Fig. 9, is preferably the same as the ratio of the linear speed of the loading conveyor to that of the pusher bar, so that the pusher bar as it travels from A to C on its pushing stroke will, at the same time, travel a transverse distance equal to AB, which is the distance the loading conveyor will have travelled in the same time.

To fully describe the transfer cycle, reference is made to Figs. 13, 14 and 15. In Fig. 15, the pusher bar is shown in the position of dwell between cycles and is about to transfer the row of articles in front of it.

In Fig. 13, the pushing stroke represented by the line AC has just been completed and the row of articles has been transferred to the main conveyor 1.

The second part of the cycle is the retraction stroke represented by the line CD, during which the pusher bar moves diagonally back across the feed conveyor to the position shown in Fig. 14. The first article in the new row to be transferred has meanwhile advanced to the position at T, but the speed of the pusher bar is such that it passes in front of this advancing row on its retraction stroke.

The third part of the cycle is the idle stroke represented by the line DA, during which the bar travels parallel to but in the opposite direction to that of the feed conveyor until it again reaches its initial position shown in Fig. 15, from which the next cycle starts.

The pusher bar now remains stationary until the next row of bottles is complete, as shown in Fig. 15, and the next cycle is ready to begin. During the time period for the pusher bar cycle, the main conveyor will have advanced a distance equal to the transverse centerline spacings of the ware as shown in Fig. 15, thus providing space for the next incoming transverse row.

The starting of the transfer cycle is timed with the movement of the loading conveyor in such a way that the pusher bar normally starts after the loading conveyor has moved a definite distance. This distance, as previously described, is slightly less than the width of the main conveyor 1.

It occasionally happens that when the pusher bar is ready to start the transfer cycle, the last bottle in the row about to be transferred has not moved to a position completely in the path of the pusher bar, and would be retarded or deflected out of position by the pusher bar or moved off of the conveyor belt and out of the path of the pusher bar. In this event, the starting of the transfer cycle is delayed until the bottle has moved completely into the path of the pusher bar by means of the mechanism including limit switches and a photo-electric cell shown in Fig. 12.

The limit switch LS—1 is called the "start" switch and is normally held open except when the lever is thrown up due to the action of cam 55 on roller 56, Figs. 5 and 6. Referring to Fig. 5, sprocket 67 is keyed to loading conveyor shaft 14 and is chained to sprocket 68 which is in turn keyed to the cam shaft 55ᵃ. The numbers of teeth on sprockets 67 and 68 are such that cam 55 makes one revolution while the feed conveyor moves a distance slightly less than the width of the main conveyor. The high part of cam 55 is made long enough to keep LS—1 closed during approximately one-fourth of a revolution of the cam or about 90° of the cycle.

Limit switch LS—2 is called the "stop" switch and is normally held closed except when the lever 57a is thrown to the left, Fig. 2, through the action of lug 57 on the chain 40, Figs. 2 and 9.

Contacts $R^a$ in photo-electric relay R are closed when a beam of light from light source L shines on the photo-cell P. The contacts $R^a$ open when the light beam is interrupted by a bottle on feed conveyor 4. In Figs. 3 and 4 and photo-cell P and light source L are shown on the outside of the lehr chamber, one above the other, the light being reflected to the photo cell from the mirror M. By placing the light source or the cell in a prepared place within the lehr chamber, direct rays from the light source may be used as in Fig. 12.

Magnetic switch C has three sets of contacts, C—2 and C—3 being normally open and C—1 being normally closed. When coil $C^a$ is energized, contacts C—2 and C—3 close and C—1 opens.

It is apparent that one of the two solenoids SB—1 or SB—2 is always energized, depending upon whether coil $C^a$ is energized. Fig. 12 shows coil $C^a$ deenergized, contacts C—2 and C—3 open and contacts C—1 closed, with solenoid SB—1 deenergized and SB—2 energized. When coil $C^a$ is energized, C—2 closes and C—1 opens, and solenoid SB—1 is energized and SB—2 is deenergized.

The circuit through limit switches LS—1, LS—2, contacts $R^a$ and C—3 is the control circuit to coil $C^a$ in the magnetic switch. LS—1 and LS—2 are connected in parallel in a loop, and contacts $R^a$ and C—3 are connected in parallel in a second loop, the two loops being connected together in series.

The control circuit is completed whenever one contact in each of the two loops is closed. More specifically, the control circuit is completed when LS—1 and $R^a$ are closed, or if LS—1 and C—3 are closed, or if LS—2 and $R^a$ are closed, or if LS—2 and C—3 are closed.

In operation, when the first bottle G of a row has reached the position shown in Fig. 4 and the pusher bar 54 is still stationary, the lever of limit switch LS—2 is resting on the lug 57 of chain 40, so that LS—2 is open. Cam 55 is lifting the lever on LS—1 and LS—1 is about to close, but is still open. Bottle F, Fig. 4, has passed beyond the light beam, so that the light beam is not interrupted, and contacts $R^a$ are closed. Since both LS—1 and LS—2 are open, the coil $C^a$ is not energized, and contacts C—2 and C—3 are open, and contacts C—1 are closed. Solenoid SB—2 is energized, so that brake shoe 16 is set on drum 18 and brake shoe 15 is released from drum 17. Since drum 18 is locked, shafts 22, 30, 35, chain 40, and pusher bar 54 are held stationary, and drum 17 is revolving idly due to the action of the epicylic gear train driven from shaft 20.

At this point, cam 55 closes switch LS—1, and since $R^a$ is closed, the control circuit is completed through $R^a$, LS—1 and coil $C^a$ so that coil $C^a$ is energized, causing contacts C—2 and C—3 to close and contacts C—1 to open, energizing solenoid SB—1 and deenergizing solenoid SB—2. Brake shoe 16 is released from drum 18, and brake shoe 15 is set on drum 17, locking it. Shaft 20 now drives shafts 22 through the gear train, and motion is transmitted through miter gears 25, 31, shaft 30, sprockets 33 and 34, sprocket 36, chain 40 and attachment 41 to pusher bar 54, which goes through transfer cycle previously described.

Shortly after the pusher bar has started its cycle, the lug 57 rides off the lever of limit switch LS—2 and this switch returns to its normally closed position. It is to be observed that LS—2 closes before LS—1 opens, since cam 55 keeps LS—1 closed for about one-fourth of the duration of the cycle, and one of the two limit switches will always be closed during the transfer cycle of the pusher bar.

Also, since contacts C—3 are closed during the transfer cycle, coil $C^a$ is kept energized by the control circuit through limit switch LS—2 or LS—1 and contacts C—3, even though contacts $R^a$ open every time a subsequent bottle interrupts the light beam.

Meanwhile, cam 55 allows LS—1 to resume its normally open position. When the pusher bar returns to its starting position the lug 57 on chain 40 throws the lever of switch LS—2 to the left, opening this switch and breaking the control circuit, both limit switches now being open, and deenergizing coil $C^a$. Contacts C—2 and C—3 open and C—3 close, deenergizing solenoid SB—1 and energizing solenoid SB—2, causing brake 15 to be released from drum 17 and brake 16 to be set on drum 18, stopping the pusher bar.

If the bottle F, Fig. 4, is still interrupting the light beam at the time cam 55 closes switch LS—1, contacts $R^a$ are open, and since contacts C—3 are open, the control circuit is not completed through coil $C^a$. As soon as the bottle moves past the light beam contacts $R^a$ close and complete the control circuit through $R^a$, LS—1 and coil $C^a$, and the transfer cycle is initiated. The location of the light beam along the feed conveyor is so adjusted with respect to the starting position of the pusher bar that the bottle F will be completely in the path of the pusher bar by the time the bottle moves past the light beam.

The limit switch is adjustably mounted so that it can be shifted parallel to the line AD in Fig. 9. Also the lug 57 on chain 40 may be changed in its location with respect to attachment 53, so that any point in the line AD may be made to represent the starting point of the pusher bar cycle. Assume that for the position of the light beam in Fig. 4 the starting position of the pusher bar is such that the bottle F will be completely in the path of the pusher bar by the time the bottle moves past the light beam.

Now if the light beam is shifted to the left of the position shown in Fig. 4, the starting position of the pusher bar will have to be moved to the right by an amount which has the same ratio to the amount that the light beam was shifted as the ratio of the linear velocity of the arm to the linear velocity of the feed conveyor. In practice the light beam is placed conveniently near the location shown in Fig. 4 and the limit switch LS—2 is shifted until the correct starting position of the pusher bar is found.

The speed of the feed conveyor is regulated by the hand wheel 76 which controls the variable speed device 8, the conveyor speed being dependent upon the diameter of the ware, speed of production and the desired spacing of the ware on the feed conveyor. The receiving end of the feed conveyor is located with reference to finishing mold O, Fig. 13, on the forming machine (not shown) or the discharge end of an intermediate conveyor between the mold and the feed conveyor.

As shown in Fig. 13, the forming machine take-out device (not shown) receives ware from the mold 0, depositing it in rhythmic succession upon the feed conveyor. The spacing between these pieces of ware is adjusted by varying the speed of the feed conveyor drive. It is to be noted that the linear speed of the pusher bar always bears the same ratio to that of the loading conveyor.

For the purpose of preventing the toppling-over of bottles or other ware during the transfer from the feed conveyor to the main conveyor, a stabilizer rod 69 extends across and in front of the row of bottles on the feed conveyor. This rod is welded to two studs 70 and these are adjustably clamped to the legs of angles 71 extending transversely of the lehr and held firmly by the nuts threaded on the studs 70.

The other angle legs are bolted through the vertical slot in links 72 providing vertical adjustment of the angles on the said links, made necessary by the variable heights of the bottles. The studs 70 are also vertically adjustable by means of holes or continuous slots in the angle legs.

The vertically swinging arms 73 are pivoted upon brackets firmly attached to the pendant shafts 52 and 53. The swinging ends of arms 73 are pivotally attached to the vertical link 72 in pantographic form, the entire stabilizer mechanism thus moving with the push-bar 54 in its horizontal path.

A dog 74 is rigidly attached in the position shown to the upper arm 73 and is adapted to engage and slide over the lifting guide 75, this guide being stationary relative to the vertically slidable frame 2.

In the advance of the transfer mechanism longitudinally of the lehr tunnel, the dog 74 is swung upwardly, which motion is imparted to the arms 73, the link 72, the studs 70 and the rod 69. The dog engages and rides upon a lifting guide 75 immediately after the chain attachment 41 has passed the point C in Fig. 9, the guide being of sufficient length to prolong the elevation of the rod 69 until it has taken a position to the rear of the bottle necks. It will be seen that the stabilizer rod is closely adjacent and in front of the row of ware during the entire pushing operation. It is lifted at the end of the pushing action and descends to its original position after passing to the rear of the ware.

The frame supporting the loading mechanism carries guides 77 which are vertically slidable upon angles 83, these being firmly attached to the lehr body.

For the purpose of conserving the heat within the annealing chamber and for regulating the temperature in the feed conveyor housing 2, a curtain 79 is positioned in the narrow space between the loader and lehr members. It is suspended upon wire ropes 81, 81a, one at either end and both leading over sheaves 80 to a counterweight 82 which balances the weight of the curtain. The curtain is lowered so that it clears the tops of the highest articles by a small margin.

In order to close the triangular opening in the top of the loader chamber, the cover plate 53b has holes through which the pendant tubes 52 and 53 pass in proper location. The cover plate is slidable horizontally upon the chamber cover and its dimensions are such that it closes the triangular opening at all positions of the transfer members.

We claim:

1. Article loading and transfer mechanism comprising a loading conveyor for continuously feeding rows of articles, a receiving conveyor operative at right angles to said loading conveyor and being of a width to receive a row of the articles, a transfer mechanism including a pusher arm disposed parallel to the path of travel of said loading conveyor and adapted for engaging a row of the articles and moving them simultaneously from said loading conveyor to the receiving conveyor, drive mechanism for said loading conveyor including means for actuating said pusher arm, said means comprising a plurality of pendant shafts supporting said pusher arm, a pantograph frame supporting said shafts, and means for actuating said frame to subject the pusher arm to movement in a triangular path, said last-named means including means for rendering the pusher arm actuating means inoperative at the completion of its transfer cycle.

2. Article loading and transfer mechanism comprising a loading conveyor for continuously feeding a row of articles, a receiving conveyor operative at right angles to said loading conveyor and being of a width to receive a row of the articles, a transfer mechanism including a pusher arm disposed parallel to the path of travel of said loading conveyor and adapted for engaging a row of the articles and moving them simultaneously from said loading conveyor to the receiving conveyor, drive mechanism for said loading conveyor and a differential gear mechanism connecting the drive mechanism of the loading conveyor with the transfer mechanism for actuating the pusher arm, a cam-operated limit-switch connected to the drive mechanism of the loading conveyor, electro-magnetic means controlling the differential gear mechanism to render the pusher arm intermittently operative while maintaining constant drive connection with the loading conveyor, means delaying the operation of said last-named means until all of the articles of the row to be contacted by the pusher arm are in register with said arm, and a limit-switch in the path of movement of the transfer mechanism to control said electromagnetic means.

3. Article loading and transfer mechanism comprising a loading conveyor for continuously feeding a row of articles, a receiving conveyor operative at right angles to said first named conveyor and being of a width to receive a row of the articles, a transfer mechanism including a pusher arm disposed parallel to the path of travel of said loading conveyor and adapted for engaging a row of the articles and moving them simultaneously from said loading conveyor to the receiving conveyor, a drive mechanism for said loading conveyor, a differential gear mechanism connecting the drive mechanism of the loading conveyor with the transfer mechanism for actuating the pusher arm, electro-magnetic means controlling the differential gear mechanism to render the pusher arm intermittently operative while maintaining constant drive connection with the loading conveyor, a cam-operated limit-switch connected to the drive mechanism of the loading conveyor and in circuit with the electromagnetic means, a limit-switch in the path of movement of the transfer mechanism to control said electromagnetic means, and means including a photoelectric cell and relay to retard the closing of the circuit for energizing said electro-magnetic means in accordance with the passing of the ware on the loading conveyor through the light reflected to the photo-cell.

4. Article loading and transfer mechanism comprising a loading conveyor for continuously feeding rows of articles, a receiving conveyor operative at right angles to said loading conveyor and being of a width to receive a row of the articles, a transfer mechanism including a pusher arm disposed parallel to the path of travel of said loading conveyor and adapted for engaging a row of the articles and moving all of them simultaneously from said loading conveyor to the receiving conveyor, a differential drive mechanism for the loading conveyor and transfer mechanism, a pair of magnetic brakes controlling the operation of the differential drive to intermittently actuate said transfer mechanism while maintaining continuous motion of the loading conveyor, a limit-switch operative by the first named conveyor drive and a limit-switch operative by the transfer mechanism to alternately energize and deenergize the electro-magnetic brakes of said differential drive whereby to start and stop movement of the transfer mechanism, and means delaying the operation of said magnetic brake controlling means until all of the articles of the row to be contacted by the pusher arm are in register with said arm.

5. Apparatus for transferring rows of articles which comprises a loading conveyor and a receiving conveyor, means for subjecting said loading conveyor to continuous movement, a transfer mechanism having a pusher arm disposed parallel to the path of travel of said loading conveyor, operating mechanism for subjecting said pusher arm to movement in a horizontal plane to transfer rows of articles from the loading conveyor to the receiving conveyor, mechanism controlling the movement of the pusher arm to coordinate such movement with the movement of the loading conveyor, means responsive to the location of the articles on said loading conveyor for delaying the operation of said pusher arm movement controlling mechanism until all of the articles of the row to be contacted by the pusher arm are in register with said arm, and means operative by the pusher arm operating mechanism for stopping movement of said arm when the latter is retracted to its normal idle position.

6. Apparatus for transferring rows of articles which comprises a loading conveyor and a receiving conveyor, means for subjecting said loading conveyor to continuous movement, a transfer mechanism having a pusher arm disposed parallel to the path of travel of said loading conveyor, operating mechanism for subjecting said pusher arm to movement in a horizontal plane to transfer rows of articles from the loading conveyor to the receiving conveyor, mechanism controlling the movement of the pusher arm in response to movement of said loading conveyor, and means delaying the operation of said pusher arm movement controlling mechanism until all of the articles of the row to be contacted by the pusher arm are in register with said arm.

WILLIAM A. MORTON.
HAROLD A. MOORE.
HERMAN A. ROTH.